(12) United States Patent
Williams

(10) Patent No.: US 12,338,138 B2
(45) Date of Patent: Jun. 24, 2025

(54) WATER PURIFIER AND SUPPLY IN A VEHICLE

(71) Applicant: TOYOTA MOTOR ENGINEERING & MANUFACTURING NORTH AMERICA, INC., Plano, TX (US)

(72) Inventor: Paxton S. Williams, Milan, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 513 days.

(21) Appl. No.: 17/721,256

(22) Filed: Apr. 14, 2022

(65) Prior Publication Data
US 2023/0331585 A1    Oct. 19, 2023

(51) Int. Cl.
*C02F 1/00* (2023.01)
*B60R 16/023* (2006.01)

(52) U.S. Cl.
CPC ............ *C02F 1/008* (2013.01); *B60R 16/023* (2013.01); *C02F 1/001* (2013.01); *C02F 2201/006* (2013.01); *C02F 2201/008* (2013.01); *C02F 2209/42* (2013.01)

(58) Field of Classification Search
CPC ...... C02F 9/00; C02F 1/32; C02F 1/72; C02F 1/48; C02F 1/42; B60P 3/36; B60P 14/04
See application file for complete search history.

(56) References Cited

U.S. PATENT DOCUMENTS

| | | | |
|---|---|---|---|
| 2017/0225658 A1* | 8/2017 | Quintero Perez | B60L 1/003 |
| 2018/0283307 A1* | 10/2018 | Dudar | F02M 26/49 |

FOREIGN PATENT DOCUMENTS

| | | | | |
|---|---|---|---|---|
| CN | 205292563 U | | 6/2016 | |
| CN | 205737168 U | | 11/2016 | |
| CN | 107152049 A | * | 9/2017 | |
| CN | 105253055 B | | 10/2017 | |
| CN | 106277093 B | | 8/2019 | |
| CN | 110329138 A | * | 10/2019 | B60N 3/18 |
| CN | 210881845 U | | 6/2020 | |

(Continued)

OTHER PUBLICATIONS

CN-107152049-A—Translation (Year: 2017).*

(Continued)

*Primary Examiner* — Jennifer Dieterle
*Assistant Examiner* — Cameron J Allen
(74) *Attorney, Agent, or Firm* — SHEPPARD, MULLIN, RICHTER & HAMPTON LLP; Daniel N. Yannuzzi

(57) ABSTRACT

Systems and methods are provided for a water purifier and supply in a vehicle. In particular, the water purifier and supply system may filter or purify collected precipitation for vehicle occupants to consume inside the vehicle cabin. Certain embodiments of the water purifier and supply system may include a water management system operated by an electronic control unit that detects the level of water in the water management system, determines a preferred level of water in the water management system, compares the detected level of water to the preferred level of water, and adjusts features of the water management system to increase the stored supply of purified or filtered water for vehicle occupant hydration.

20 Claims, 8 Drawing Sheets

(56) References Cited

FOREIGN PATENT DOCUMENTS

| | | | | |
|---|---|---|---|---|
| CN | 113043929 | A | * | 6/2021 |
| CN | 112248915 | B | | 7/2021 |
| CN | 214433687 | U | * | 10/2021 |
| DE | 102009012055 | A1 | | 9/2010 |
| EP | 2767447 | B1 | * | 10/2020 ................ B60S 1/50 |

OTHER PUBLICATIONS

CN-110329138-A—Translation (Year: 2019).*
CN-113043929-A Translation (Year: 2021).*
CN-214433687-U Translation (Year: 2022).*

* cited by examiner

WATER PURIFIER AND SUPPLY IN A VEHICLE

TECHNICAL FIELD

The present disclosure relates generally to water purifiers and water supply systems in a vehicle. In particular, some implementations may relate to a water management system that collects water from precipitation outside the vehicle, purifies the collected water into purified, drinkable water, and then dispenses the purified water inside the vehicle cabin.

DESCRIPTION OF RELATED ART

Vehicle occupants may require hydration at various points in time when occupying a vehicle. Conventional hydration systems, such as water bottles and drink containers, are limited by the quantity of water such a bottle or container can hold. For example, a 32 oz. water bottle is limited to storing 32 fluid ounces of water (or other liquids). Additionally, traditional vehicles do not have on-board water storage, water collection, or water filtration. Meaning, when a vehicle occupant has exhausted their supply of water stored in a bottle or container, the only option they have for refilling their water supply is to stop, exit the vehicle, and refill their bottle or container at a water source external to the vehicle (e.g., a gas station, a home faucet, etc.). More advanced vehicles may have locations to store water jugs (i.e., one gallon camping reservoirs), however, these water jugs still require an external water source to be refilled, and further provide no method for filtering the water once placed in the jug. This severely limits vehicle occupants' ability to sufficiently hydrate when occupying a vehicle for extended periods of time. For example, a vehicle occupant may run out of stored water when car camping or driving through the desert and be forced to exit their vehicle to refill their bottle or container, which may be problematic as clean sources of water may be limited or sufficient water supplies themselves may be sparse.

BRIEF SUMMARY OF THE DISCLOSURE

According to various embodiments of the disclosed technology, a water purifier and supply system in a vehicle is disclosed herein. In various embodiments, a water management system may comprise one or more water collection points; a water purification mechanism; a reservoir; one or more water dispensers; and an electronic control unit (ECU). The ECU may include machine executable instructions in non-transitory memory to detect a water level in the water management system; determine a preferred water level in the water management system; compare the detected water level to the preferred water level; and adjust collection points in the water management system to increase the detected water level to reach the preferred water level.

In certain embodiments, the ECU may operate on the water management system to purify precipitation collected by the one or more water collection points, purify the water through the water purification mechanism, and deposit the purified water into the reservoir for dispensing through the one or more water dispensers.

In certain embodiments, the one or more water collection points may be located externally on a vehicle, the water purification mechanism and the reservoir may be located internally on the vehicle, and the one or more water dispensers are located in the vehicle's cabin.

In certain embodiments, the ECU may include further instructions to: detect a water level inside water management system, which may include either: detect a water level inside the reservoir; or detect a combined water level inside the water purification mechanism, reservoir, and one or more water dispensers.

In certain embodiments, the ECU may include further instructions to: detect a default preferred water level in the water management system; determine whether a vehicle occupant has set a different preferred water level from the default water level; and maintain the default preferred water level unless the vehicle occupant has set a different preferred water level, in which case, adjusting the preferred water level to the vehicle occupant's preferred water level.

In certain embodiments, the ECU may include further instructions to: actuate at least one motor to adjust the opening of the collection points.

In certain embodiments, the collected precipitation may be transported through the vehicle's HVAC system to heat or cool the collected precipitation.

In certain embodiments, the one or more water dispensers may comprise an opening to drain spilled water that is rerouted back to the water purification mechanism for recycled use.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
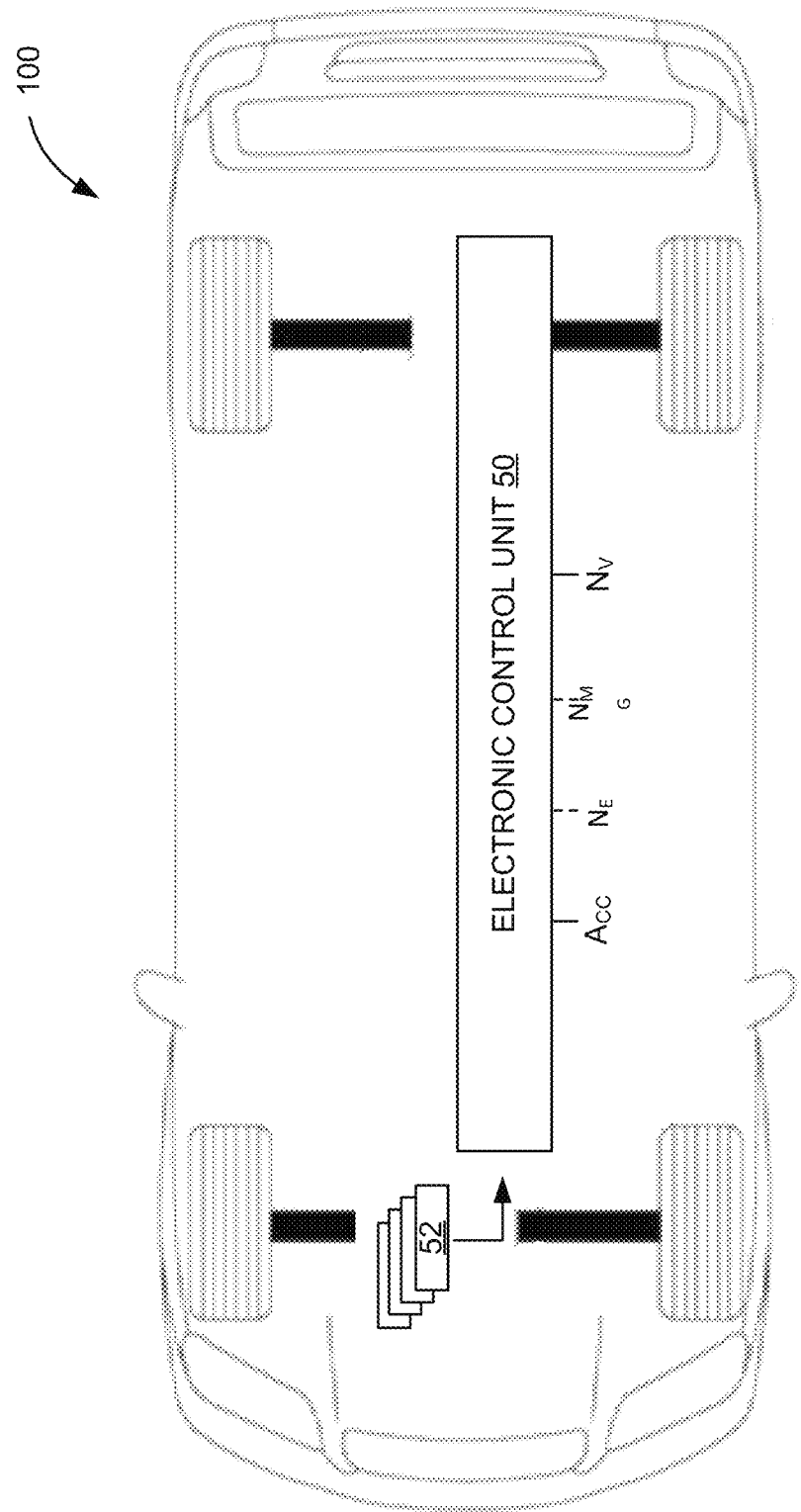
FIG. 1 is a schematic representation of an example vehicle having an electronic control unit and sensors in which various embodiments of the water purifier and supply system in a vehicle may be implemented.

The figures are not exhaustive and do not limit the present disclosure to the precise form disclosed.

DETAILED DESCRIPTION

Water purifier and supply systems in a vehicle may refer to water management systems in a vehicle that collect water from precipitation (e.g., rain, snow, dew), pass the collected water through a water purification mechanism, and deposit the purified, clean, and drinkable water into a reservoir, which can subsequently be pumped to a water dispenser located inside the vehicle cabin, allowing for vehicle occupants to refill water bottles and containers.

A problem with conventional water purifiers and water supplies is that they are not integrated into a vehicle and further provide no method for water collection from precipitation. Meaning, that for traditional water purifiers and supplies to function, a vehicle occupant must exit the vehicle, find a water source, and then collect the water from the source for purification. This system is both slow, inefficient, and impractical for vehicle occupants who wish to maintain sufficient water supplies during vehicle occupation, and ensure that they are consuming water meeting safety standards sufficient for human consumption.

A problem with traditional vehicles is they have no system or method for collecting, storing, purifying, or dispensing water within the vehicle. In fact, traditional vehicles have no water management system at all. This lack of water management system forces vehicle occupants to be subjected to the limits of water storage that they correctly plan for and can physically carry, or that they can find to properly purify from an external source. For example, for a vehicle occupant to maintain sufficient levels of hydration throughout a camping trip, they must either (1) calculate the amount of water each vehicle occupant needs per day and multiply that by the number of days they are away from a clean water source, and then pack or store that calculated amount of water in the interior of the vehicle cabin; or (2) bring complex water purification mechanisms that require the vehicle occupant to find appropriate water sources while in the wild, which may require extensive searching, time, and effort, beyond what a reasonable vehicle occupant wishes to, or may be capable of, engaging in while camping.

Moreover, conventional water purification mechanisms may require extensive knowledge about the mechanical workings of such a purifier, which may extend beyond the knowledge of the average vehicle occupant who wishes to appreciate a camping trip. Further, various conventional water purification systems require extensive manual pumping to push water from the water source, through the purifier, and into a purified water receptacle. The amount of force required to engage such a system may be too much for vehicle occupants with limited strength or mobility (i.e., senior citizens, young children). Alternatively, if vehicle occupants attempt to carry water stored in bottles or containers, they will be entirely limited by the sufficiency of the stored water. For example, a vehicle occupant may not consider the amount of water needed for cooking, and discover they brought insufficient water supplies, and as a result suffer from dehydration during a portion of their occupancy in the vehicle. In another example, all of the carried water may be stored in a single container, which could fail if punctured by other camping supplies, such as a camping knife or hiking pole, forfeiting the entirety of the vehicle occupants' water, also causing dehydration or even death of vehicle occupants over extended periods of time.

Embodiments of the presently disclosed technology respond to comfort, safety, and accessibility challenges for vehicle occupant hydration when in a vehicle by collecting, storing, purifying, and dispensing water through an onboard and integrated water management system. By doing this, embodiments can increase the amount of time vehicle occupants can consume water without supplementing their water supply from external sources, and reduce the amount of pathogens, contaminants, and distasteful or otherwise harmful elements present in the water vehicle occupants consume.

In various embodiments, a water management system in a vehicle may comprise a water management system, operated or controlled by an electronic control unit (ECU), which may include various collection points, water purification mechanisms, dirty and/or clean water reservoirs, and interior cabin water dispensers.

In various embodiments, the collection points may be located on the exterior of the vehicle and collect precipitation in the form of rain water, snow, and/or dew. The collection points may be opened or closed by the ECU, allowing for controlled intake or collection of precipitation into the water management system. For example, if the ECU determines that a water level in the reservoir is lower than a preferred water level, the ECU may send signals instructing the collection points to open, which may allow precipitation to be collected from the exterior of the vehicle. As discussed below, the ECU may monitor environmental sensors and may only open the collection points when precipitation is detected outside the vehicle, to prevent debris such as dust or sand from filling the collection points. For example, the ECU may receive signals from environmental sensors indicating that it is raining, and subsequently send signals to the water management system to open the collection points. Alternatively, the ECU may receive signals from the environmental sensors that it is dry outside the vehicle and then send signals to close the collection points to prevent clogging with debris. In other embodiments, the ECU may receive signals from particulate sensors and close the collection point opening if too high of contaminating particle levels are detected outside in the vehicle.

In various embodiments, the collection points may be connected to a water purification mechanism. In some embodiments, the collection points may transport the precipitation near or through portions of the vehicle HVAC system before the purifier to additionally purify the water, or heat or cool water for a vehicle occupant's preference. Water purification mechanisms, as discussed in reference to FIG. 4 below, may filter or purify collected precipitation, transforming the dirty, collected, precipitation, into clean, purified, and drinkable, water.

In various embodiments, the water purification mechanism may be connected to a reservoir. The reservoir may be a potable water container, allowing for clean water storage. For example, the vehicle may open the collection points when vehicle sensors detect that it's raining, and collect enough water to be filtered so the detected water level may increase to the preferred water level. In this example, the clean water may be stored in the reservoir for consumption by vehicle occupants at the vehicle occupants' leisure. In other words, the clean water may be stored for vehicle occupants to refill water bottles and containers from the water management system, even when precipitation is not simultaneously being collected from the collection points. In various embodiments, vehicle occupants can dispense water from the water management system with the water management system is simultaneously collecting water, or when the water management system is dispensing water solely from the reservoir. In other embodiments, vehicle occupants may add water themselves through an inlet to the reservoir for water storage without collecting precipitation.

In various embodiments, the reservoir may be connected to a water dispenser located inside the vehicle cabin. Water may be transported from the reservoir to the water dispenser via a water pump or other methods of moving water through a liquid system. The water dispenser may be a nozzle or faucet in the vehicle's cabin. For example, the water dispenser may be located in the center console for vehicle occupant access, along the interior side panel of a passenger or driver door, or in association with any cup holder in the vehicle. In another example, the water dispenser may be placed outside the vehicle for cleaning or other water usage. The aforementioned placements of water dispensers are merely exemplary and one skilled in the art would understand that water dispensers can be placed at various places in a vehicle.

The disclosed water management system in a vehicle may be operated by an electronic control unit (ECU). Here, the ECU may (1) detect the level of water in the water management system; (2) determine a preferred water level in the water management system; (3) compare the detected water level to the preferred water level; and (4) adjust the collection points to increase the detected water level to reach the preferred water level.

First, the detected water level may be composed of information relating to the current water volume in the entire water management system, or merely in the reservoir, information relating to the current water height (in relation to the total height of the reservoir) in the reservoir, information relating to the predicted water level (amount of water collected minus amount of water dispensed in the vehicle cabin), and any other information indicative of the quantity of water present in the water management system or in the reservoir at the time of detection. For example, the ECU may monitor water sensor or water switches (true/false switches, which give true reading when water is detected, false when no water is detected) that indicate one liter of water is present in the reservoir based on the water surpassing the placement of the water switch, which may be placed at a height in the reservoir indicative of one liter of water. In such an example, when the water surpasses the water switch, it may send a binary signal to the ECU that represents water volume of at least the level of the water switch. In some embodiments, it is beneficial to detect the water level for the entire water management system as there is likely water being filtered in addition the water detected in the reservoir, and closing the collection points prior to the reservoir reaching the preferred water level may reduce the risk of leakage or overfilling of the reservoir.

Second, the preferred water level in the water management system or reservoir may be determined in various ways. In certain embodiments, the preferred water level may be a full reservoir, meaning that the ECU will only consider the preferred water level to be reached when the detected water level fills the entire reservoir. In certain embodiments, the preferred water level may be set by vehicle occupants, and may be changed intermittently. In such an embodiment, the ECU may check the current preferred water level instruction and then only consider signals from above such a current preferred water level. In other embodiments, the preferred water level may be established or set by the vehicle manufacturer or by default settings. In various embodiments, the ECU may consider the default water level as the standard, and then check for vehicle occupant input adjusting the preferred water level before sending signals to close or open the collection points.

Third, comparing the detected water level to the preferred water level may be done mechanically or by the ECU. For example, the ECU may receive signals representing the detected water level in the form of numerical values (i.e., 5 representing 5 liters), and a preferred water level in similar numerical values. In this example, the ECU would compare the numerical values (i.e., 5 liters detected, 5 liters preferred=sufficient water levels reached), and adjust the collection points based on the outcome of the comparison. In embodiments where the detected water level is less than the preferred water level, the ECU may send signals to open the collection points allowing for precipitation to be collected, increasing the detected water levels. In embodiments where the detected water level is equal to, or greater than the preferred water level, the ECU may either send signals to close the collection points (if they were previously opened) or to keep the collection points closed, as sufficient water levels were detected to be present in the reservoir or the whole water management system. In other embodiments, the reservoir may contain a drain, which may allow the ECU to send signals to empty a portion of the reservoir to reach the preferred water level, or empty the entire reservoir for cleaning or vehicle storage.

Fourth, adjusting the collection points to increase the detected water level to reach the preferred water level, may be done in various ways. In certain embodiments, the ECU may send signals to actuators connected to the collection points or embodied in the collection points that can increase the diameter of the opening of the collection point, or remove a barrier covering the collection point. In other embodiments, other systems may be used to open and close the collection points, for example, a pneumatic actuator. By doing this, the ECU can control the amount of precipitation or water entering the water management system, and further monitor and control the amount of water that is readily available to vehicle occupants, ensuring sufficient water for adequate human hydration is available.

It should be understood that the systems and methods disclosed herein may be implemented with any of a number of different vehicles and vehicle types. For example, the systems and methods disclosed herein may be used with automobiles, trucks, motorcycles, recreational vehicles and other like on or off-road vehicles. In addition, the principals disclosed herein may also extend to hybrid vehicles, gasoline- or diesel-powered vehicles, fuel-cell vehicles, electric vehicles, or other vehicles.

FIG. 1 is a schematic representation of an example vehicle (vehicle 100) having an electronic control unit 50 and sensors 52 in which various embodiments of the water purifier and supply system in a vehicle may be implemented.

Electronic control unit 50 may include circuitry to control various aspects of vehicle operation. Electronic control unit 50 may include, for example, a microcomputer that includes one or more processing units (e.g., microprocessors), memory storage (e.g., RAM, ROM, etc.), and I/O devices. The processing units of electronic control unit 50, may execute instructions stored in memory to control one or more electrical systems or subsystems in the vehicle. Electronic control unit 50 can include a plurality of electronic control units such as, for example, a water level detection module, a preferred water level determination module, a collection point control module, a water filtration control module, a water dispenser control module, an electronic engine control module, a powertrain control module, and so on. These various control units can be implemented using two or more separate electronic control units, or using a single electronic control unit.

In the example illustrated in FIG. 1, electronic control unit 50 receives information from a plurality of sensors 52 included in vehicle 100.

Sensors 52 may be included to detect conditions external to the vehicle 100. For example, sensors 52 may include imaging sensors (such as cameras), and environmental sensors (such as a hygrometer, rain switch, or rain sensor) to detect whether there is precipitation outside the vehicle, and if there is precipitation detected, to determine the rate or amount of precipitation the vehicle is coming into contact with. For example, the rain sensor may detect that rain is hitting the vehicle, and subsequently determine that 0.5 milliliters (mL) of rain per square inch is coming into contact with the vehicle.

Electronic control unit 50 may utilize the aforementioned sensors to detect whether the collection points should be opened and determine how long the collection points on the vehicle 100 should remain open for. The rate of precipitation may be a factor that the electronic control unit 50 uses to determine whether to open the collection points and for how long they should remain open. As described above, electronic control unit 50 may utilize this rate of precipitation to increase and maintain the supply of clean water readily available to vehicle occupants.

Sensors 52 may also include sensors which are internal to the vehicle. For example, sensors 52 may include water level sensors or switches, which can indicate whether the water level in the water reservoir is above a certain threshold or preferred level, and if the water level is above or below the preferred level, by how much the water level exceeds or falls short of the preferred water level. Accordingly, the electronic control unit 50 can utilize information from these sensors to determine whether to adjust the collection point openings, and if the collection point openings are adjusted to open, determine how long they should remain open to increase the water level to the preferred water level in the reservoir.

Sensors 52 may also include sensors which detect vehicle operation. For example, sensors 52 may include sensors which detect accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. Electronic control unit 50 may use data collected from these sensors to determine that vehicle 100 is moving, or moving above a threshold speed (e.g., above five miles per hour). In certain examples, electronic control unit 50 may restrict water dispensing inside the vehicle cabin when vehicle 100 is moving, or moving faster than a threshold speed. This restriction can be because it is unsafe for a vehicle occupant to attempt to refill a water bottle from a water dispenser when the vehicle is moving, as it risks distracting the vehicle driver or spilling water within the vehicle cabin. In other embodiments, electronic control unit 50 may restrict adjustment of the collection point openings when vehicle 100 is moving above a high-threshold speed (e.g., above 50 miles per hour). This restriction can be because when vehicles are moving quickly, water being directed into the collection points is more likely to be mixed with debris that may shorten the life of the purifier or filter in the water purification mechanism.

One or more of the sensors 52 may include their own processing capability to compute the results for additional information that can be provided to electronic control unit 50. In other examples, one or more sensors may be data-gathering-only sensors that provide only raw data to electronic control unit 50. In further examples, hybrid sensors may be included that provide a combination of raw data and processed data to electronic control unit 50. Sensors 52 may provide an analog output or a digital output.

Figure 2:
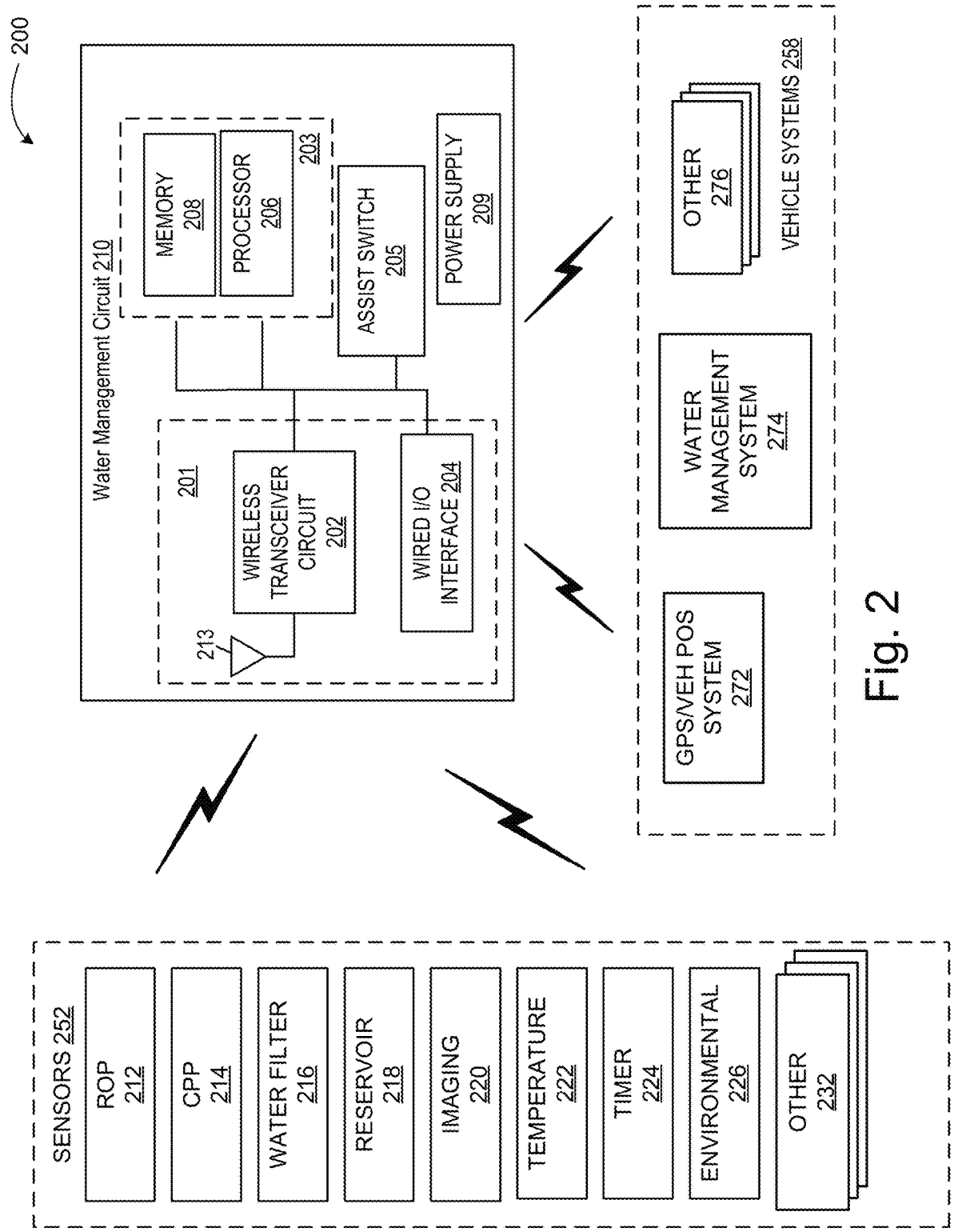
FIG. 2 illustrates an example architecture for (1) detecting a water level in the water management system; (2) determining a preferred water level in the water management system; (3) comparing the detected water level to the preferred water level; and (4) adjusting the collection points to increase the detected water level to reach the preferred water level, in accordance with various embodiments of the disclosed technology.

FIG. 2 illustrates an example architecture for (1) detecting a water level in the water management system; (2) determining a preferred water level in the water management system; (3) comparing the detected water level to the preferred water level; and (4) adjusting the collection points to increase the detected water level to reach the preferred water level, in accordance with various embodiments disclosed herein.

Referring now to FIG. 2, in this example, the water purifier and supply system in a vehicle 200 includes a water management circuit 210, a plurality of sensors 252, and a plurality of vehicle systems 258. Sensors 252 and vehicle systems 258 can communicate with water management circuit 210 via a wired or wireless communication interface. Although sensors 252 and vehicle systems 258 are depicted as communicating with water management circuit 210, they can also communicate with each other as well as with other vehicle systems. Water management circuit 210 can be implemented as an ECU or as part of an ECU such as, for example electronic control unit 50. In other examples, water management circuit 210 can be implemented independently of an ECU.

Water management circuit 210 in this example includes a communication circuit 201, a decision circuit 203 (including a processor 206 and memory 208 in this example) and a power supply 209. Components of water management circuit 210 are illustrated as communicating with each other via a data bus, although other communication in interfaces can be included. Water management circuit 210 in this example also includes a manual assist switch 205 that can be operated by the user to manually select the preferred water level in the reservoir or to drain the reservoir for cleaning/maintenance.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions, and variables for processor 206 as well as any other suitable information. Memory 208, can be made up of one or more modules of one or more different types of memory, and may be configured to store data and other information as well as operational instructions that may be used by the processor 206.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a water management circuit 210.

Communication circuit 201 may include either or both of a wireless transceiver circuit 202 with an associated antenna 213 and a wired I/O interface 204 with an associated hardwired data port (not illustrated). As this example illustrates, communications with water management circuit 210 can include either or both wired and wireless communications circuits 201. Wireless transceiver circuit 202 can include a transmitter and a receiver (not shown) to allow wireless communications via any of a number of communication protocols such as, for example, Wifi, Bluetooth, near field communications (NFC), Zigbee, and any of a number of other wireless communication protocols whether standardized, proprietary, open, point-to-point, networked or otherwise. Antenna 213 is coupled to wireless transceiver circuit 202 and is used by wireless transceiver circuit 202 to transmit radio frequency (RF) signals wirelessly to wireless equipment with which it is connected and to receive RF signals as well. These RF signals can include information of almost any sort that is sent or received by water management circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 209 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 52 such as those described above with reference to the example of FIG. 1. Sensors 252 can also include additional sensors that may or may not otherwise be included on a standard vehicle with which the water purifier and supply system in a vehicle 200 is implemented. In the illustrated example, sensors 252 include rate of precipitation (ROP) sensors 212, collection point position (CPP) sensors 214 (for detecting whether the collection point opening is open, closed, or partially opened), water filter sensors 216 (e.g., filtration rate sensors, filer health sensor, filter capacity sensors), reservoir sensors 218 (e.g., water switch, water sensor, fluid volume sensor), imaging sensors 220, temperature sensors 222 to determine whether the water in the water management system may freeze, timers 224 or timing sensors, and environmental sensors 226 (e.g., to detect the presence of rain, increased humidity, or other environmental conditions).

Additional sensors 232 can also be included as may be appropriate for a given implementation of water purifier and supply in a vehicle system 200. For example, additional sensors 232 may include water quality sensors, water salinity sensors, hygrometers, and other water safety sensors.

Vehicle systems 258 can include any of a number of different vehicle components or subsystems used to control or monitor various aspects of the vehicle and its performance. In this example, the vehicle systems 258 include a GPS or other vehicle positioning system 272 for detecting the location of vehicle 100 in relation to known water sources (e.g., gas stations, towns, lakes); water management system 274 for controlling the collection point, collecting precipitation, purifying the collected precipitation, storing the purified water, and dispensing the water in the vehicle cabin; and other vehicle systems 276.

GPS/vehicle positioning system 272 may include one or more vehicle positioning systems that receive sensor data from one or more sensors 252. Vehicle positioning system 272 may determine the geographic location of the vehicle 100 or proximity of the vehicle to water sources that may be utilized by occupants. For example, if the GPS system determines that the vehicle's entire GPS route is in close proximity to gas stations, the system may reduce the preferred level of water in the water management system. Alternatively, if the GPS route includes a 400 mile stretch of desert, the system may increase the preferred water level prior to departure.

Water management system 274 may include collection points that are opened and closed by signals from the ECU. The water management system 274 may also include a water purification mechanism, reservoir, and water dispenser that the ECU may monitor the level of water present therein, and adjust the collection point opening to control. Water management system 274 may also include sensors that can determine a current level of water in the water management system or in the reservoir.

Other systems 276 may include various standard and non-standard systems that may be implemented into the water purifier and supply system in a vehicle 200. For example, an alternative precipitation module may be implemented to detect precipitation other than rain, such as snow, and determine the rate of precipitation for the snowfall (i.e., how long the collection points should remain open to fill the reservoir) and then send signals representative of said rate to the ECU.

During operation, water management circuit 210 can receive information from various vehicle sensors to determine whether to open or close the collection points. Communication circuit 201 can be used to transmit and receive information between water management circuit 210 and sensors 252, and water management circuit 210 and vehicle systems 258. Also, sensors 252 may communicate with vehicle systems 258 directly or indirectly (e.g., via communication circuit 201 or otherwise).

Figure 3:
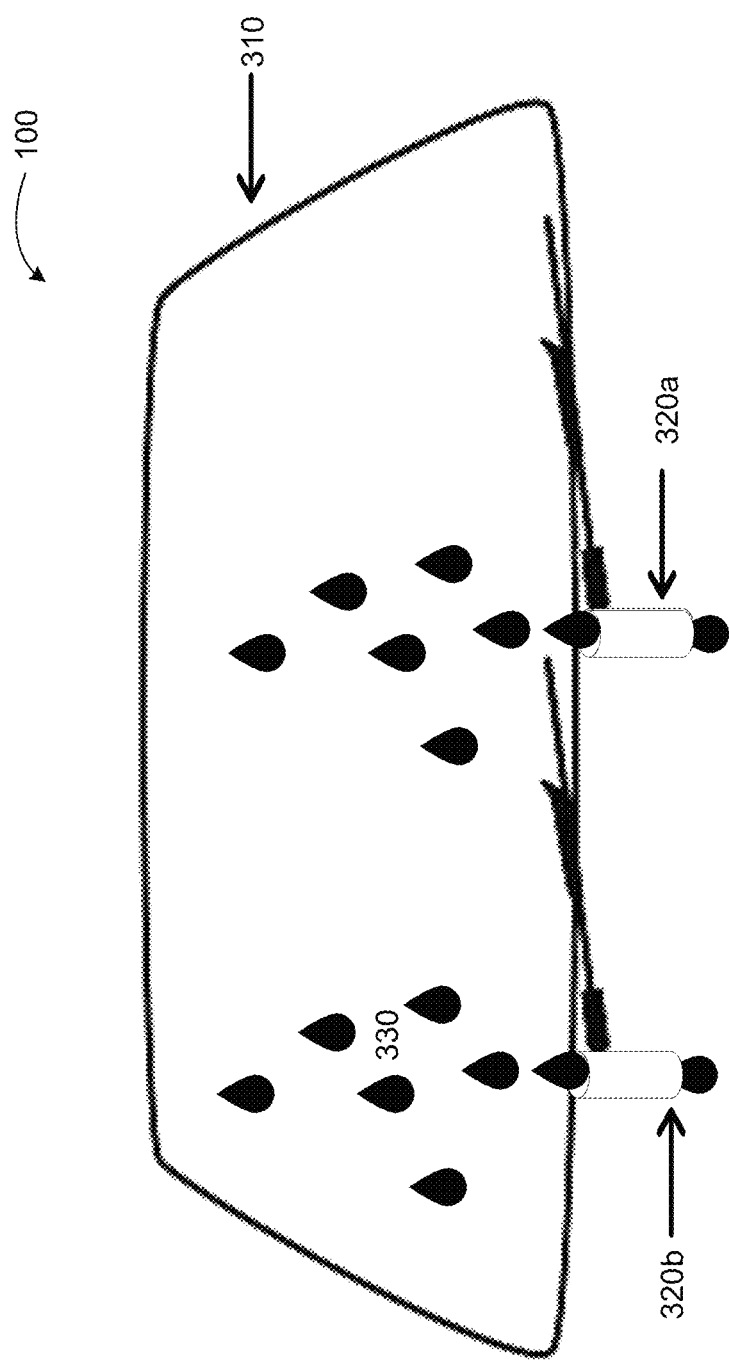
FIG. 3 depicts an example set of collection points on a vehicle, in accordance with various embodiments of the disclosed technology.

FIG. 3 depicts an example set of collection points on a vehicle, in accordance with various embodiments of the disclosed technology.

As depicted, vehicle 100 may implement or position the collection points 320a, 320b along the lower edge of the windshield 310. In other embodiments, the collection points 320a, 320b may be implemented or positioned at other points on the vehicle. For example, collection points may be positioned at the lower edge of the rear window, side windows, rooftop, bumper, or other areas of the vehicle 100 that precipitation may fall and subsequently collect. In the example illustrated in FIG. 3, the collection points 320a, 320b may be positioned in between the base edge of the windshield 310 and the hood of the vehicle (not illustrated). The collection points 320a, 320b may collect precipitation 330 in the form of rainwater, snow, dew, and/or similar water-based deposits. Once the precipitation 330 reaches the windshield 310, the precipitation 330 may descend, with the help of gravity, toward the base edge of the windshield 330. In some embodiments, the collection points 320a, 320b may collect precipitation 330 randomly along the base edge of the windshield. For example, collection points may be scattered along the base edge, and collect precipitation if it happens to fall into the collection point. In other embodiments, the precipitation may be channeled into the collection points by, for example, the windshield wipers. In such an example, the collection points may be placed at the base of the windshield wipers and precipitation may be directed towards the collection points by the windshield wipers.

In the example illustrated in FIG. 3, the water purifier and supply system in a vehicle has two collection points 302a, 302b. However, this is merely illustrative. Other system may have two or more collection points that collect precipitation to be channeled into the water filtration mechanism, while other systems may have a single collection point, as discussed below.

In various embodiments, the collection points 302*a*, 302*b* may have electronically or pneumatically controlled openings (not illustrated). In such embodiments, the openings may have at least one motor or at least one pneumatic actuator, which can receive signals from the ECU. When, for example, the collection point opening is open, precipitation may be freely collected at the collection points. However, when the collection point opening is closed, precipitation may run off the base edge of the windshield in conventional manners. In some embodiments, the collection point openings may only have an open position and a closed position. In other embodiments, the collection points openings may have intermediate opening positions that may allow for differing levels of precipitation to be collected. In such embodiments, the ECU may receive signals from sensors representative of the rate of precipitation, as well as, sensor data from the reservoir representative of the volume of water in the reservoir, and calculate a preferred rate of collection through the collection points. The ECU may then send signals to the one or more motors or one or more pneumatic actuators to adjust the opening of the collection point to reach the particular rate of collection.

In various embodiments, the collection points may have cylinders with a diameter ranging from 0.1 centimeters (cm) to 10 cm. In other embodiments, the collection points may take the form of other shapes, or may even encompass the entire base edge of the windshield.

Figure 4:
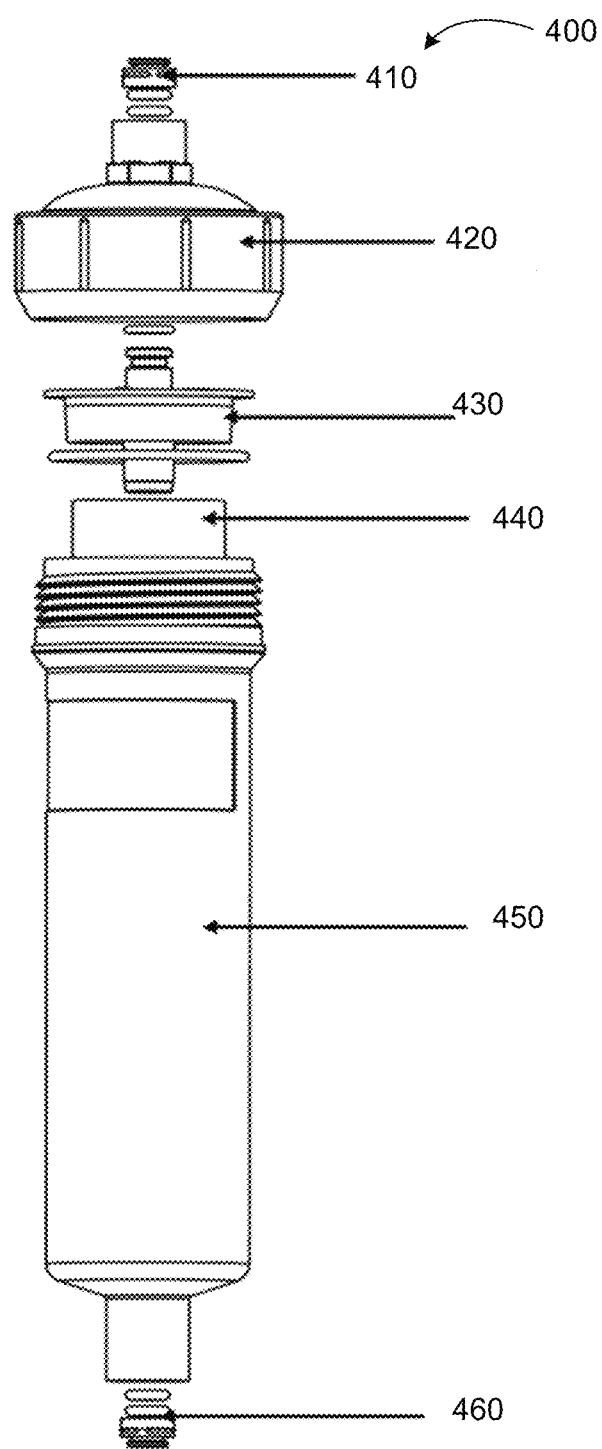
FIG. 4 depicts an example of a water purification mechanism, in accordance with various embodiments of the disclosed technology.

FIG. 4 depicts an example of a water purification mechanism, in accordance with various embodiments of the disclosed technology.

Figure 5:
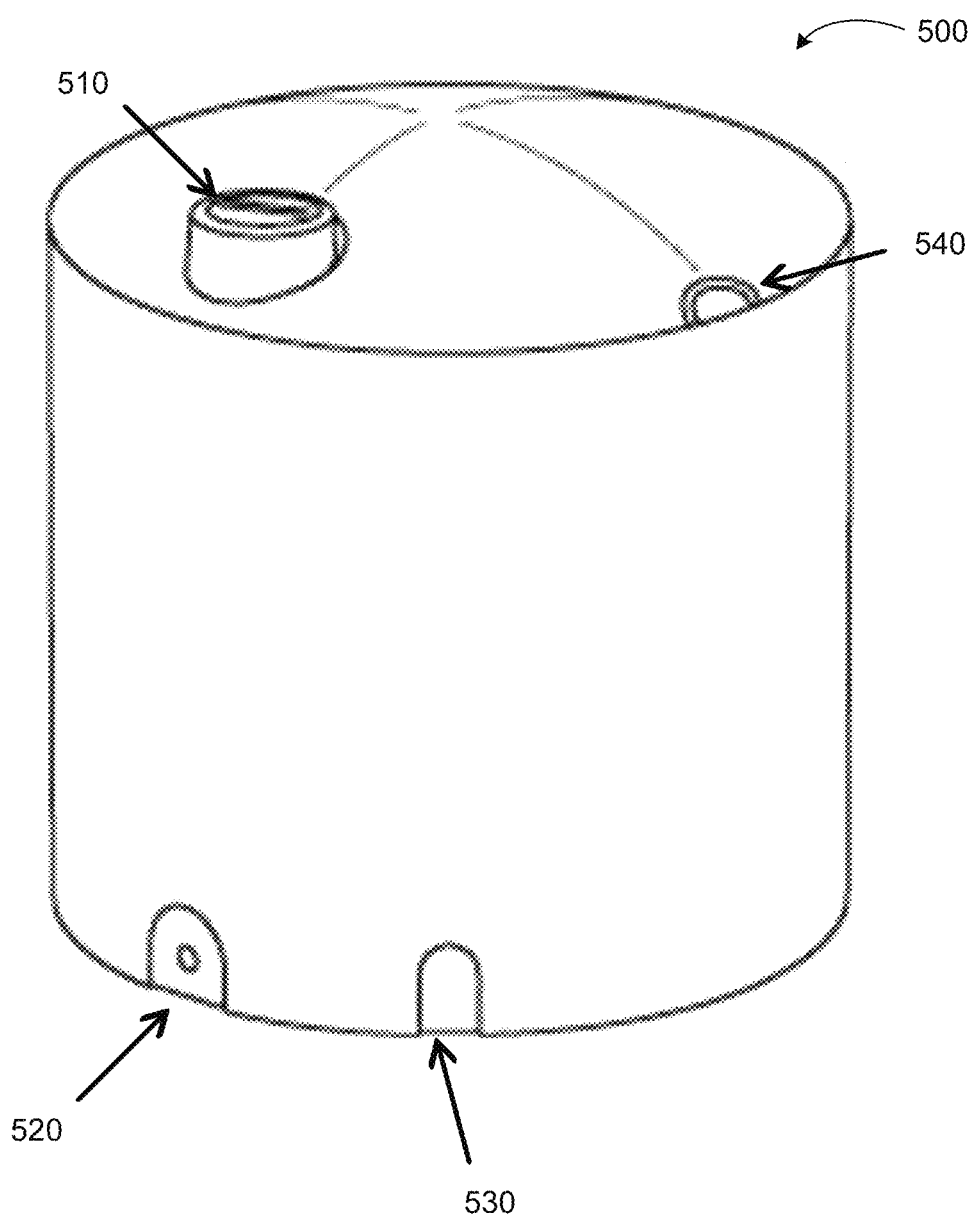
FIG. 5 depicts an example reservoir, in accordance with various embodiments of the disclosed technology.

In various embodiments of the present disclosure, a water management system may include a water purification mechanism 400. The water purification mechanism 400 may receive collected water at the inlet 460 from the collection points on the exterior of the vehicle. The collection points may be connected to the water filtration mechanism 400 via hoses, tubing, or any other suitable liquid transportation component. In an embodiment that utilizes hoses, tubing, or similar, the hoses, tubing, or similar may be connected to the inlet 460 of the water purification mechanism 400 by screwing the hose, tubing, or similar into the inlet 460, by adhesive, or by other conventional methods of connecting liquid tubing to systems. Once the collected water enters the water purification mechanism 400 through the inlet 460, the collected water enters the body 450 of the water purification mechanism 400, which comprises a water filter or purifier cartridge 440. The collected or dirty water passes through the water filter cartridge, which filters and purifies the water. The water filter cartridge can embody any form of water filtration or purification, including activated carbon, ion exchange, reverse osmosis, mechanical, absorption, sequestration, ultra violet, or any other suitable method of water filtration. In this example, the water filter cartridge 440 may be secured in the body 450 by a reusable water filter mount 430. In embodiments, the reusable water filter mount 430 is secured further with a cap 420. The cap 420 produces an airtight seal around the reusable water filter mount 430, increasing the efficiency and efficacy of the water filtration process, by increasing the water pressure throughout the water filter mechanisms 400. The filtered or purified, clean water exits the water filter cartridge 440, passes through the reusable water filter mount 430 and the cap 420, and exits the water filtration mechanism 400 at the outlet 410, where it is transported to the reservoir, as depicted in FIG. 5. The water purification mechanism 400, as depicted in FIG. 4, is merely exemplary, other water purification and filtration mechanisms are possible, so long as they produce water that is sufficiently purified or filtered to meet human health and safety standards.

In various embodiments, the water purification mechanism may be positioned or implemented inside the cabin of the vehicle, inside the engine compartment, beneath the vehicle floorboards, and/or in any other position in the vehicle that would allow for the collection points to be connected to the input, and the output be connected to the reservoir. In some embodiments, the water filtration mechanism may be placed in such a location that allows for a vehicle occupant, mechanic, or someone working on the vehicle to access the water purification mechanism to replace the filter or purifier cartridge.

In various embodiments, the water purification mechanism may have sensors, for example sensors 252 or 52, attached to the input, output, or both to detect the amount of water passing through the purifier. Signals from the sensors representative of the detected amount of water may be used by the ECU to determine the total quantity of water in the water management system, may be used by the ECU to notify the vehicle occupants when a filter or purifier replacement is necessary, and/or may be used by the ECU to display, for vehicle occupants, other information relating to the filter, such as a rate of filtration.

FIG. 5 depicts an example reservoir, in accordance with various embodiments of the disclosed technology.

In various embodiments of the present disclosure, a water management system may include a reservoir 500. In various embodiments, the reservoir 500 may be a water reservoir. The reservoir 500 may receive water at an inlet 510 from the water purification mechanism. The water purification mechanism may feed directly into the inlet 510 on the reservoir 500 or may be connected by hoses, tubing, or any other suitable liquid transportation component. Once the purified water enters the reservoir 500 through the inlet 510, the water can be stored in the body of the reservoir 500 until it is dispensed in the vehicle cabin. The water may exit the reservoir 500 at the outlet 520. The outlet 520 being located at the bottom of the reservoir 500 increases the potential energy of the stored water, allowing for less energy to be used to pump the water to the water dispenser. In some embodiments, the reservoir 500 may have a water sensor 530 inserted into the reservoir 500 to detect the amount or volume of water in the reservoir 500. In some embodiments, the reservoir 500 may have a water switch 540 located near the top of the reservoir 500, which produces true/false (binary) logic signals (e.g., true when water is detected, false when water is not detected). In these embodiments, the water switch 540 may simply indicate whether there is water at the top of the reservoir 500, and may not indicate how much or how little water is in the reservoir 500 otherwise.

In various embodiments, the reservoir may be placed anywhere on the interior of the vehicle. For example, the reservoir may be placed within or below the driver's center console, which may allow for a shorted transportation distance from the reservoir to the water dispenser. The reservoir may be surround or embedded with heating or cooling elements, which may allow for vehicle occupants to select a desired temperature of water to be dispensed. In other embodiments, the ECU may send signals to heating units surrounding or embedded within the reservoir when it detects from temperature sensors that below freezing temperatures are outside the vehicle, which may prevent freezing of the water or other features of the water management system. In other embodiments, the reservoir may be placed near the vehicle's HVAC system, allowing for combined vehicle cooling and water heating, as well as additional heating and cooling of the reservoir.

The reservoir 500 is merely exemplary, and one skilled in the art would understand that any reservoir, potable container, jug, bottle, storage method, or similar potable water storage component can be implemented to store water. For example, the reservoir 500 may be a one gallon reservoir, which can hold up to one fluid gallon of water or other liquids. This is merely exemplary, other reservoir sizes are possible.

Figure 6:
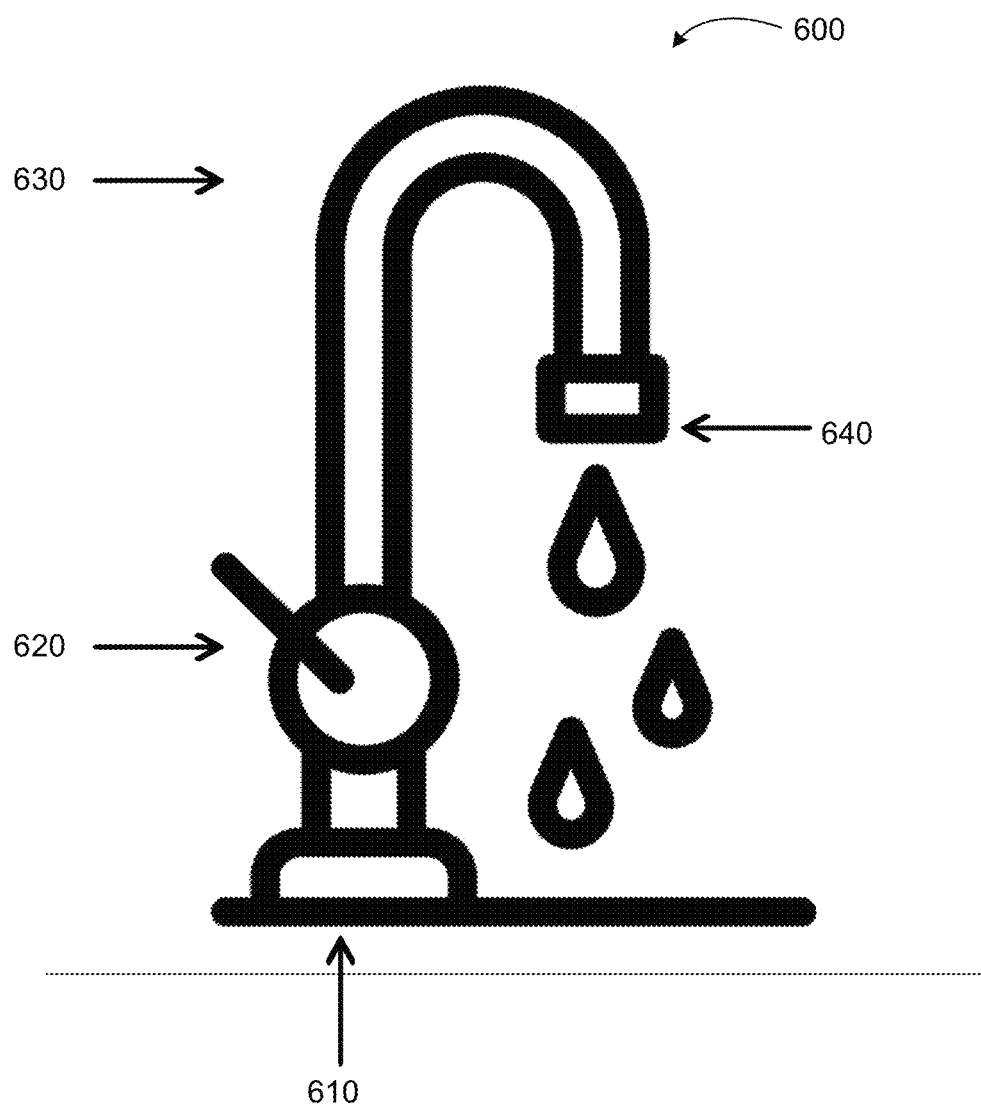
FIG. 6 depicts an example water dispenser, in accordance with various embodiments of the disclosed technology.

FIG. 6 is an example water dispenser in a vehicle, in accordance with various embodiments of the disclosed technology.

In various embodiments of the present disclosure, a water management system may include a water dispenser 600. The water dispenser 600 may receive water at an inlet 610 from the reservoir. In some embodiments, there may be a water pump (not illustrated) in between the reservoir and the inlet 610 on the water dispenser 600. In such embodiments, the water pump may receive signals from the ECU to activate and pump water from the reservoir to the water dispenser 600. In such embodiments, the ECU may receive signals from various sensors, including sensors located in the water dispenser 600, for example, at the handle 620. In other embodiments, the handle 620 may open the piping internally located on the water dispenser 600, allowing for purified water to flow in through the inlet 610, and through the body 630 of the water dispenser 600. The water may exit the water dispenser 600 at the outlet 640, which may have a water bottle or container placed beneath, allowing for vehicle occupants to refill such a container.

In various embodiments, the water dispenser may be located in the center console of the vehicle, allowing occupants to open the center console for water dispensing. In other embodiments, the water dispenser may be located in the side panel of any of the vehicles doors, allowing water bottles and containers to be refilled at the cup holder in the door. In such embodiments, the tray beneath the cupholder may include an opening to drain spilled water, which may be rerouted back to the water filtration mechanism for continued/recycled use.

The water dispenser 600 is merely exemplary, and one skilled in the art would understand that any water dispenser, spout, faucet, drain, rerouting system, or similar water distribution apparatuses can be implemented to dispense water in the vehicle cabin. For example, water dispenser 600 may be a hose that extends from the central dashboard of the vehicle allowing for vehicle occupants in rear passenger seats to refill their water bottles without leaving their seats.

Figure 7:
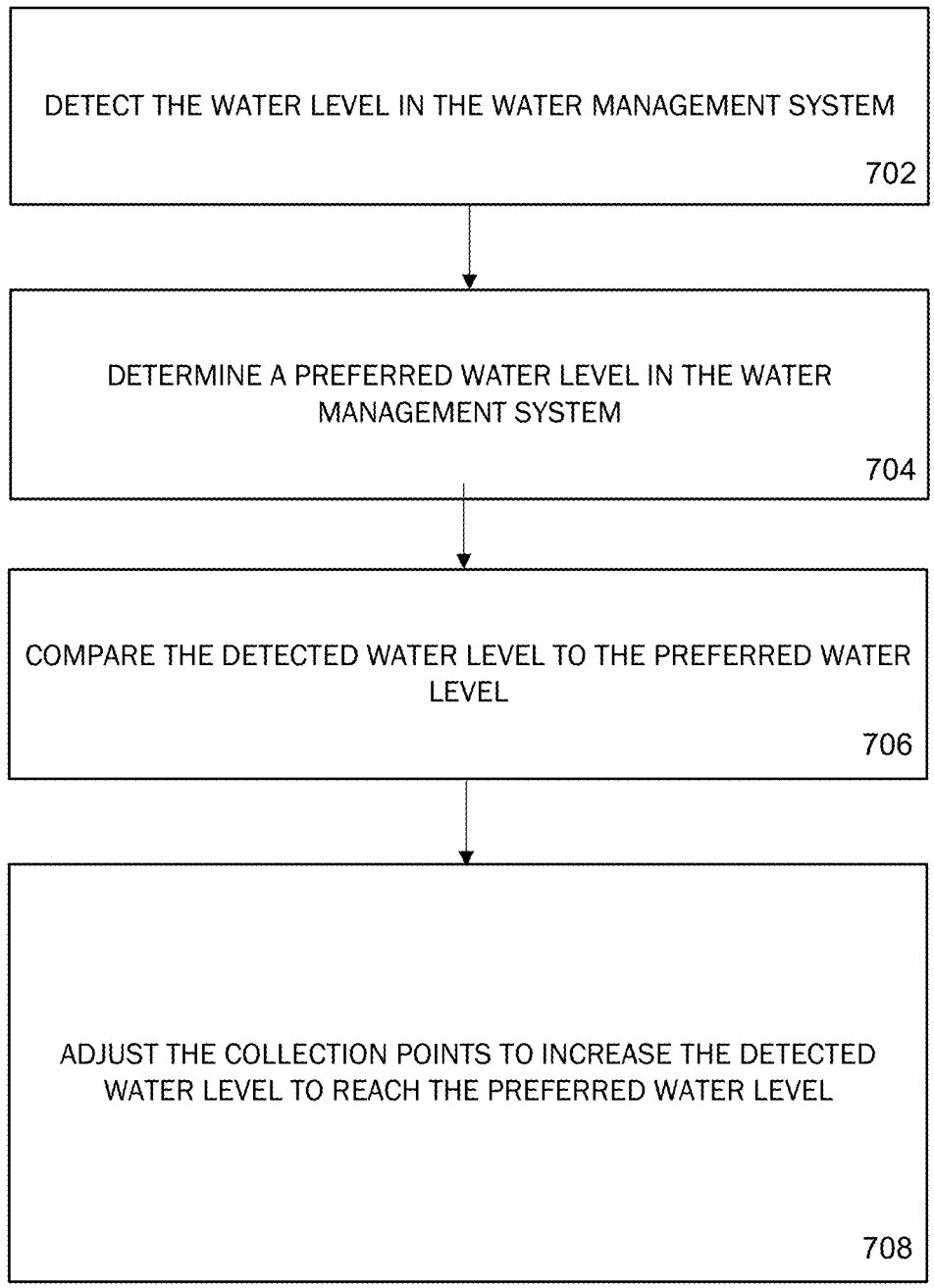
FIG. 7 is a flowchart illustrating example operations that can be performed by an electronic control unit in a vehicle to adjust the collection points of the water management system, in accordance with various embodiments of the disclosed technology.

FIG. 7 is a flowchart illustrating example operations that can be performed by an electronic control unit in a vehicle to adjust the collection point openings in response to precipitation being detected outside of the vehicle, and/or the water level in the reservoir or water management system being lower than the preferred water level, in accordance with various embodiments of the disclosed technology.

At operation 702, the ECU may detect the water level in the water management system. As described in conjunction with FIGS. 1, 2, and 5, the ECU may utilize various sensors on the vehicle to detect the water level in the water management system, including the water level in the reservoir.

At operation 704, the ECU may determine a preferred water level in the water management system. As described in conjunction with FIGS. 1, 2, and 5, the ECU may utilize manufacturer's or default settings to determine a preferred water level, or may determine the preferred water level based on vehicle occupant preference.

At operation 706, the ECU may compare the detected water level to the preferred water level in the water reservoir to determine whether the detected water level reaches, matches, or exceeds, the preferred water level.

At operation 708, in response to a determination that the detected water level is below the preferred water level, the ECU may adjust the collection point openings by actuating at least one motor, pneumatic system, or similar moveable feature to allow for water to be collected from the exterior of the vehicle. Accordingly, the preferred water level may take into account the environmental factors surrounding the vehicle (i.e., the rate of precipitation), the regularity in which vehicle occupants utilize the water dispenser, and/or the preferred water level set by vehicle occupants. Otherwise, if no preferred water level is set, the preferred water level may return to a default level.

In some cases, the ECU of the water management system may set a preferred water level based on vehicle occupant preference. In various embodiments, a vehicle's occupant may set a preference for how much water they like to be actively stored when operating the vehicle, or may have a preference for how much water they like stored during a particular type of excursion or trip. For example, a vehicle occupant who typically only uses their vehicle to commute may require less onboard water storage, and may prefer a lighter vehicle (without stored water weight) for fuel efficiency, and thus, set their preferred water level to be lower than a default setting. In such an example, the ECU detects that the water level reaches the preferred water level, the ECU may send signals to close the collection point openings, resulting in the water management system only seldomly collecting water. In another example, a vehicle occupant who typically uses their vehicle for backcountry camping trips, may wish to store the maximum amount of water onboard as possible, and may set the preferred water level to fill the entirety of the reservoir. In this example, the ECU may open the collection points more regularly to increase the level of water collection, as reaching the preferred water level may require constant water collection (limited only by the rate of precipitation). In other examples, vehicle occupants may wish to set the preferred water level to 0 (or empty), which may prevent the water management system from ever collecting water in this setting. This may be due to certain climates. For example, vehicle occupants who live in northern, colder regions, may set their preferred water level to 0 during the winter months in order to prevent freezing in the water management system or malfunctioning due to the cold weather. In certain embodiments, the ECU may automatically deactivate the water management system when environmental sensors detect below freezing temperatures.

As described above, the water purifier and supply system in a vehicle may provide increased access to hydration in a vehicle. In other words, those with limited access to clean water or substantive water sources may be able to experience higher levels of hydration when operating a vehicle away from traditional water sources. In this way, hydration in vehicle occupants may be increased while allowing vehicle occupants the freedom to drive and explore anywhere (including away from traditional water sources) they may desire to go.

The examples of FIGS. 1-7 are provided for illustration purposes only as examples of vehicle systems with which embodiments of the disclosed technology may be implemented. One of ordinary skill in the art reading this description will understand how the disclosed embodiments can be implemented with other vehicle platforms.

Figure 8:
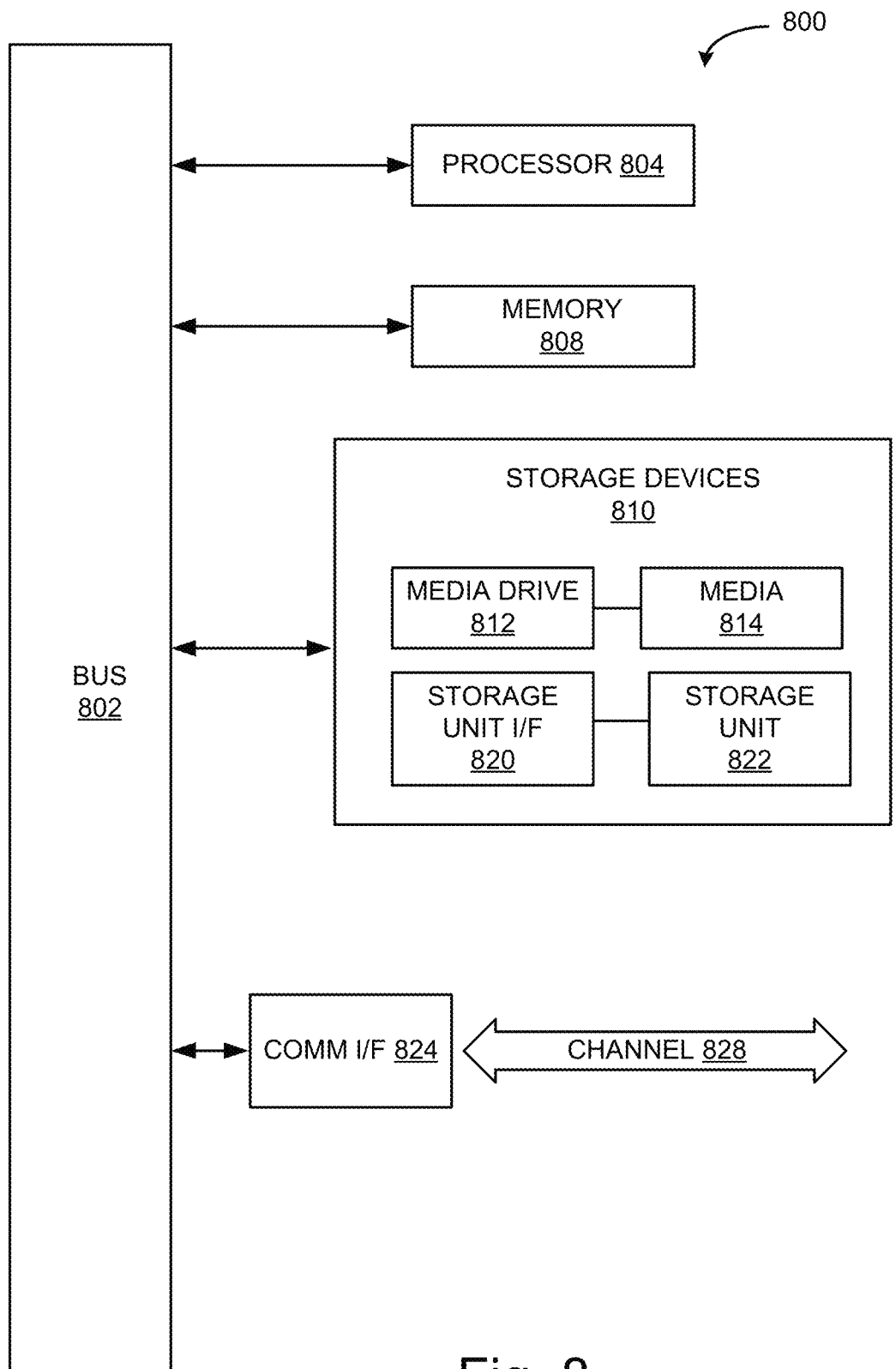
FIG. 8 is an example computing component that may be used to implement various features of embodiments described herein.

As used herein, the terms control, operate, and component might describe a given unit of functionality that can be performed in accordance with one or more examples of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various examples are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative examples, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

It should be noted that the term "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A water management system, comprising:
    an environmental sensor configured to detect precipitation;
    a closeable water collection inlet configured to open when the environmental sensor detects precipitation and close when the environmental sensor ceases to detect precipitation;
    a water purifier;
    a reservoir;
    a water dispenser disposed within a cabin of a vehicle, wherein the closeable water collection inlet, the water purifier, the reservoir, and the water dispenser are in fluidic connection; and
    an electronic control unit (ECU) including machine executable instructions in non-transitory memory to:
    detect a default preferred water level in the water management system;
    determine whether a vehicle occupant has set a preferred water level different from the default preferred water level;
    adjust the closeable water collection inlet to increase a detected water level in the reservoir to reach the default preferred water level;
    maintain the default preferred water level unless the vehicle occupant has set a different preferred water level, in which case adjust the default preferred water level to the vehicle occupant's different preferred water level; and
    purify precipitation collected by the closeable water collection inlet, through the water purifier, and deposit the purified precipitation into the reservoir for dispensing through the water dispenser.

2. The water management system of claim 1, wherein the closeable water collection inlet is located externally on the vehicle adjacent to a lower edge of the vehicle's windshield, the water purifier and the reservoir are located internally on the vehicle, and the water dispenser is located in the vehicle's cabin.

3. The water management system of claim 1, wherein the electronic control unit includes further instructions to:
    detect the default preferred water level in the water management system, which comprises either:
    detect a water level inside the reservoir; or
    detect a combined water level inside the water purifier, reservoir, and water dispenser.

4. The water management system of claim 1, wherein the electronic control unit includes further instructions to:
    actuate at least one motor to adjust the opening of the closeable water collection inlet.

5. The water management system of claim 1, wherein the collected precipitation is transported through an HVAC system of the vehicle to heat or cool the collected precipitation.

6. The water management system of claim 5, further comprising a temperature control system, wherein the temperature control system further comprises a heat exchanger configured to transfer thermal energy between the vehicle's HVAC system and the collected precipitation.

7. The water management system of claim 6, wherein the temperature control system further comprises a temperature sensor positioned to monitor the temperature of the water, and the electronic control unit is configured to regulate the operation of the HVAC system based on the monitored temperature to achieve a desired water temperature.

8. The water management system of claim 1, wherein the water dispenser comprises an opening to drain spilled water that is rerouted back to the water purifier for recycled use.

9. A computer-implemented method comprising:
  detecting, by an electronic control unit (ECU), a detected water level in a vehicle's water management system;
  determining, by the ECU, a default preferred water level;
  comparing, by the ECU, the detected water level and the default preferred water level;
  adjusting at least one collection inlet of the vehicle's water management system to increase the detected water level to reach the default preferred water level;
  determine, by the ECU, whether a vehicle occupant has set a preferred water level different from the default preferred water level; and
  maintain, by the ECU, the default preferred water level unless the vehicle occupant has set the different preferred water level, in which case, adjust the default preferred water level to the vehicle occupant's different preferred water level,
  wherein the preferred water level is determined by an environmental sensor, a rate of water use, the detected water level, and a user preference.

10. The computer-implemented method of claim 9, wherein adjusting the at least one collection inlet of the vehicle's water management system comprises adjusting an opening of the collection inlet, such that water is collected through the opening.

11. A water management system for a vehicle, comprising:
  an environmental sensor configured to detect precipitation;
  a closeable water collection inlet configured to open when the environmental sensor detects precipitation and close when the environmental sensor ceases to detect precipitation;
  a water purifier;
  a reservoir;
  a water temperature control system, wherein collected precipitation is transported through an HVAC system of the vehicle to heat or cool the collected precipitation;
  a water dispenser disposed within a cabin of the vehicle, wherein the closeable water collection inlet, the water purifier, the water temperature control system, the reservoir, and the water dispenser are in fluidic connection; and
  an electronic control unit (ECU) including machine executable instructions in non-transitory memory to:
    adjust the closeable water collection inlet to increase a detected water level in the reservoir to reach a preferred water level; and
    purify precipitation collected by the closeable water collection inlet, through the water purifier and water temperature control system, and deposit purified precipitation into the reservoir for dispensing through the water dispenser.

12. The water management system of claim 11, wherein the closeable water collection inlet is located externally on the vehicle adjacent to a lower edge of the vehicle's windshield, the water purifier, the temperature control system, and the reservoir are located internally on the vehicle, and the water dispenser is located in the vehicle's cabin.

13. The water management system of claim 11, wherein the electronic control unit includes further instructions to:
  detect a default preferred water level in the water management system, which comprises either:
    detect a water level inside the reservoir; or
    detect a combined water level inside the water purifier, water temperature control system, reservoir, and water dispenser.

14. The water management system of claim 11, wherein the electronic control unit includes further instructions to:
  detect a default preferred water level in the water management system;
  determine whether a vehicle occupant has set a different preferred water level from the default preferred water level; and
  maintain the default preferred water level unless the vehicle occupant has set a different preferred water level, in which case, adjust the preferred water level to the vehicle occupant's different preferred water level.

15. The water management system of claim 11, wherein the electronic control unit includes further instructions to actuate at least one motor to adjust the opening of the closeable water collection inlet.

16. The water management system of claim 11, wherein the water dispenser comprises an opening to drain spilled water that is rerouted back to the water purifier for recycled use.

17. The water management system of claim 11, wherein the temperature control system further comprises a heat exchanger configured to transfer thermal energy between the vehicle's HVAC system and the collected precipitation.

18. The water management system of claim 11, wherein the temperature control system further comprises a temperature sensor positioned to monitor the temperature of the water, and the electronic control unit is configured to regulate the operation of the HVAC system based on the monitored temperature to achieve a desired water temperature.

19. A computer-implemented method comprising:
  collecting, by a collection inlet of a vehicle's water management system, precipitation;
  transporting the collected precipitation through an HVAC system of the vehicle to heat or cool the collected precipitation;
  detecting, by an electronic control unit (ECU), a detected water level in the vehicle's water management system, wherein the detected water level comprises a level of heated or cooled water in a reservoir;
  determining, by the ECU, a preferred water level;
  comparing, by the ECU, the detected water level and the preferred water level;
  adjusting the collection inlet of the vehicle's water management system to increase the detected water level to reach the preferred water level;
  wherein the preferred water level is determined by an environmental sensor, a rate of water use, the detected water level, the HVAC system, and a user preference.

20. The computer-implemented method of claim 19, wherein adjusting the collection inlet of the vehicle's water management system comprises adjusting an opening of the collection inlet, such that water is collected through the opening.

* * * * *